Sept. 14, 1948.  E. DUTCH  2,449,371
METHOD AND MEANS FOR WELDING PIPES AND THE LIKE
Filed July 20, 1945  2 Sheets-Sheet 1

EMERY DUTCH,
INVENTOR.

BY Julian J. Wittal
HIS ATTORNEY.

Sept. 14, 1948.    E. DUTCH    2,449,371
METHOD AND MEANS FOR WELDING PIPES AND THE LIKE
Filed July 20, 1945    2 Sheets-Sheet 2
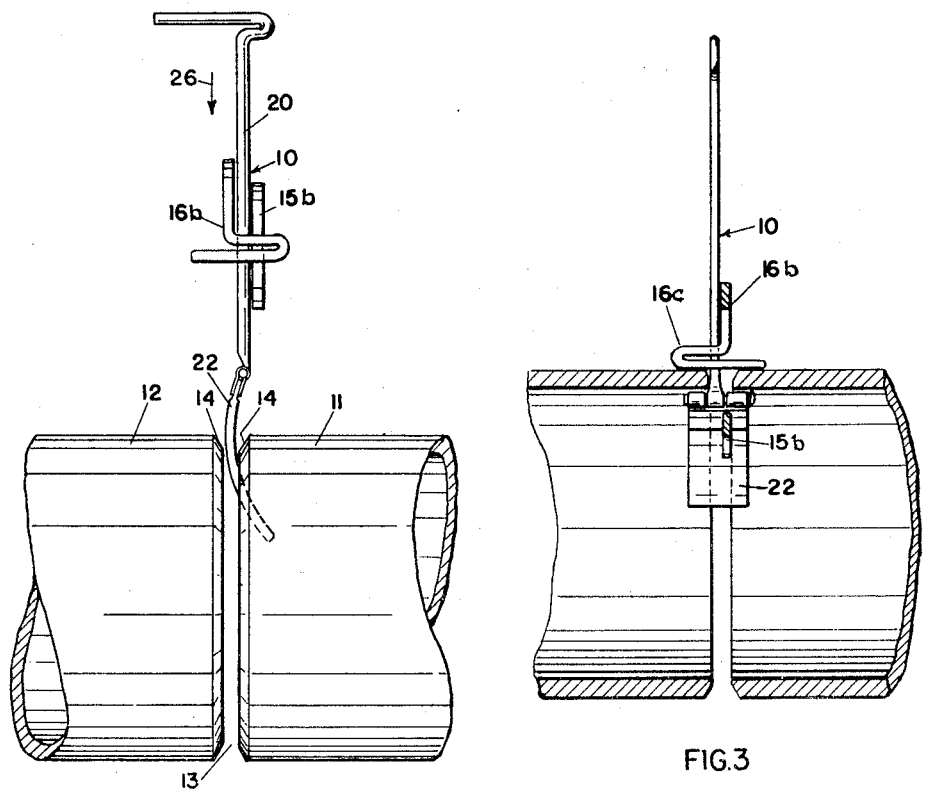
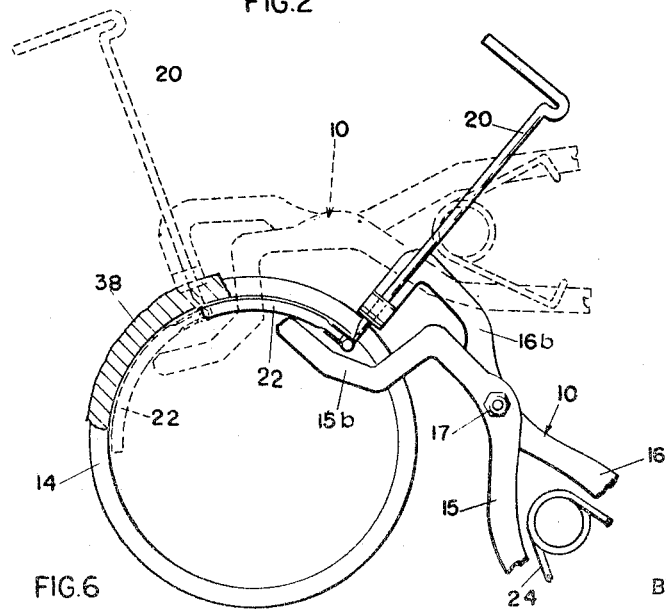
EMERY DUTCH,
INVENTOR.
BY: Julian J. Wittal
HIS ATTORNEY Patented Sept. 14, 1948

2,449,371

UNITED STATES PATENT OFFICE 2,449,371

METHOD AND MEANS FOR WELDING PIPES AND THE LIKE

Emery Dutch, New York, N. Y.

Application July 20, 1945, Serial No. 606,191

5 Claims. (Cl. 113—111)

This invention broadly has for its purpose to provide protecting means for the inside of the wall of a hollow body with an opening therein, when operations are performed on or around said opening on the outside of the body.

Particularly this invention relates to welding operations on adjacently set, but spaced apart ends of pipes, so as to keep the inside of the pipes at the welded portions smooth.

With the methods now in use, when two pipes are welded together at their ends, a good portion of the welding material will protrude into the inside of the pipe, will cause a pronounced large welding burr thereon, indeed, will cause large protruding portions on the inside wall of the pipe, and not only makes the inside surface of the pipe rough at such places, but will also restrict the diameter of the pipe at such places, whereby the speed of the fluid passing through the pipe line may be greatly diminished, the efficiency lowered, and disturbances, eddies, and other troubles and irregularities caused in the flowing of the fluid as against a desired smoothly running stream thereof.

My invention mainly aims to temporarily protect the inside of a hollow body around an opening in its wall, on which opening some operations are performed, and particularly to protect and keep smooth the inside of two pipes to be welded together, and to keep the inside of the walls smooth, and the diameter of the pipe unimpaired.

Further objects of my invention will be apparent as the specification of the same proceeds, and, among others, I may mention: to provide a method of this character which will be simple and effective, and which may be practiced without any preparation right on the job, and to provide means for practicing this method, which means will be simple in construction, easy to apply, and comparatively inexpensive to manufacture.

With the above indicated and other objects in view, and describing it in connection with two pipes, the ends of which are to be welded to one another, my invention mainly consists in providing a specific tool which is composed of two pivoted elements forming a scissor-like structure, having handle portions projecting in one direction from the pivot, and operating leg portions projecting to the other direction from the pivot, providing an inwardly and outwardly slidable and also rotatable rod on a transversely bent end of one operating leg, and, pivotally at the lower end of the rod, suspending a curved plate segment of the same contour as the inside of the pipe, said contoured plate being adapted to cover a desired portion of the opening or slot between the pipes, and providing a specific thin formation for the second leg of the tool whereby the same will be adapted to be inserted into the inside of the pipes through said slot.

When it is desired to fill in a portion of said slot through welding material, first, the plate will be turned edgewise and dropped into the inside of the pipes through said slot between them, whereupon a pressure will be exerted on the handle portions of the tool, thereby opening the working legs thereof, and inserting the second thin, specifically curved leg into the inside of the pipe through said slot, the position and thickness thereof being such that it will avoid the plate when in said edgewise position, then resting said first leg with its transverse end over the outside of the pipes across said slot, pressing the handles further back, and opening the second leg within the pipe to a further extent, turning the plate segment transversely across said slot and the end of said second leg, and then permitting a spring action between the handles of the tool to press them apart, whereupon said first working leg will be pressed on the outside of the pipes across said slot, and said second leg will cause said pivoted plate segment to be pressed against a portion of the slot between the pipes, bridging the same from the inside.

The tool is now automatically locked in this position, and the welding operation may be done along that portion of the slot protected by the curved plate, whereupon the tool may be slightly opened and moved to a new position along the slot, its handles then, again, will be permitted to snap apart, locking the plate from the inside against the next portion of the slot, welding that portion and continuing this operation around the slot until all of it is filled, with the exception of a small finishing portion, through which, by appropriate manoeuvres, said curved plate and said second leg of the tool may be removed.

It will be an easy matter then to fill that small, last remaining aperture, and even if the welding material will at that part project between the pipes, it certainly will not affect the smoothness and diameter at the welded portion to any noticeable degree.

The same method may be used in appropriate cases for protecting openings in hollow bodies, as will be obvious.

In the drawings forming a part of this specification and accompanying the same:

Fig. 2 is a side view of the ends of two pipes to be welded together, diagrammatically indicating the position of my novel tool at the start of the operation;

Fig. 3 is a longitudinal sectional view of the two pipes indicating my tool and the protecting plate segment in position while the welding is being done; the section being taken on line 3—3 of Fig. 1;

Figure 7:
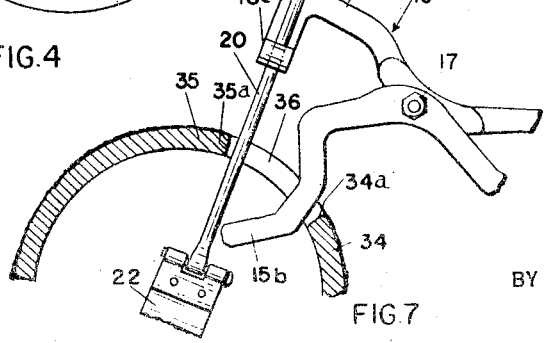

Fig. 6 is still another end view showing, in full lines, the tool in operative position, wherein a spring arranged between the handles thereof was permitted to open said handles and to close the first working leg on the outside of the pipes, and move and lock the curved plate into protecting position by the second working leg, a dotted showing of the tool indicating an earlier position thereof, while Fig. 7 is a fragmentary cross sectional view of a pipe on which the welding operation has been finished, a small intact portion or aperture being left through which the curved plate and the second operating leg of the scissor tool may be withdrawn from the inside of the pipe.

Referring now to the drawings more in detail by characters of reference, the numeral 10 indicates my tool, in general, and the various figures showing the same as applied to a welding operation designed to join a pipe 11 to a co-axial registering pipe 12, the ends of which are placed close, but spaced apart, to one another, a space 13 being left between them and the ends of the pipes preferably being bevelled as at 14, for filling the space between the two pipes with molten metal by a welding operation, as it is well known in the art.

My tool 10 has two main elements or members 15 and 16, which are joined by a pivot 17, whereby the two members 15 and 16 form a scissor-like structure. The branches 15a and 16a of the members 15 and 16, in the drawings pointing to the right from the pivot 17, are formed into grips, having the handle portions 18 and 19 respectively, while the branches or legs 15b and 16b of the members 15 and 16, in the drawings being shown as pointing to the left of pivot 17, are formed in a peculiar design as shown, and I call them operating or working branches or legs of my tool.

Figure 1:
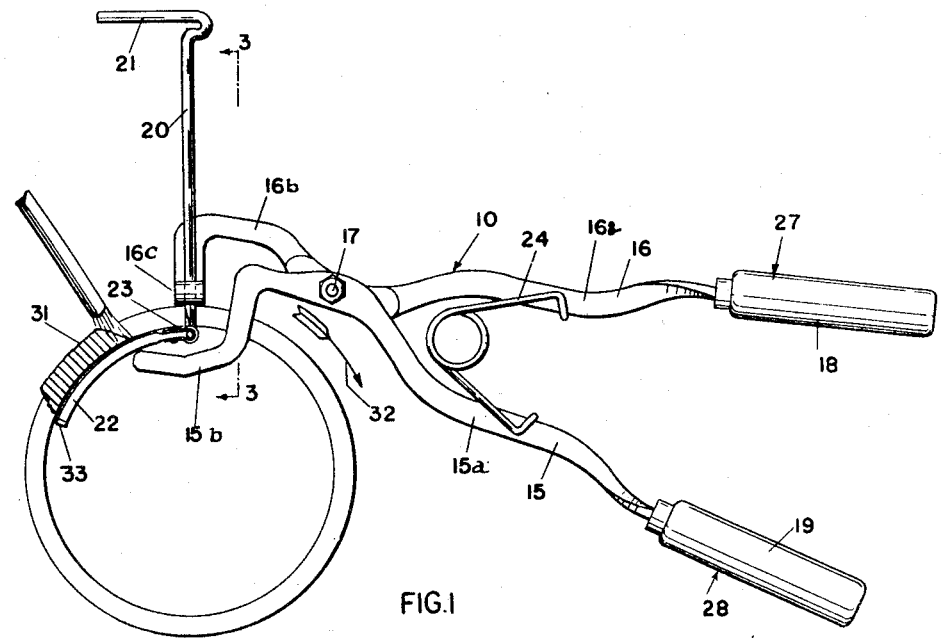
Fig. 1 is an end view of a pipe to be welded as indicated, showing the operative position of my tool while the welding is being performed.

The operating leg 16b will have its end 16c bent double transversely to the plane of the tool, while the operating leg 15b will be formed in the curved design shown in Fig. 1 and several in the other figures.

A rod 20 is slidable through appropriate apertures in the transverse end 16c, and also rotatable in said apertures, said rod having a transversely bent grip indicator 21 at its upper end. A curved plate segment 22 is hingedly secured at the lower end of the rod 20, as indicated at 23. A spring 24 is inserted between the handle branches 15a and 16a of my tool, normally tending to spread grip portions 18 and 19 apart, and, obviously, at the same time, closing the working legs 15b and 16b on one another.

In Fig. 2 I indicate the beginning of the operation for welding the ends of pipes 11 and 12 to one another, employing my novel tool for the protection of the inside of the pipes, as has been indicated hereinbefore.

It will be seen that the depending plate 22 is dropped downwardly into the inside of the pipes through the space 13 between them by permitting the rod 20 to drop downwardly, as indicated by the arrow 26, or pushing the same in that direction. It is to be noted that the center line of the rod 20 is on the left hand side of the plane of the working leg 15b, and said leg 15b is made thin enough to permit an upward or downward sliding of the rod 20 at its side.

It is also to be noted that the plate segment 22 will have the same radius of curvature as the inside radius of the pipes 11 and 12, and will have a width sufficient to cover the slot or opening 13, and also the ends of the two pipes to a desired margin, when said segment will be pressed against the slot 13 and the adjoining portions of the pipes.

Figures 4, 5:
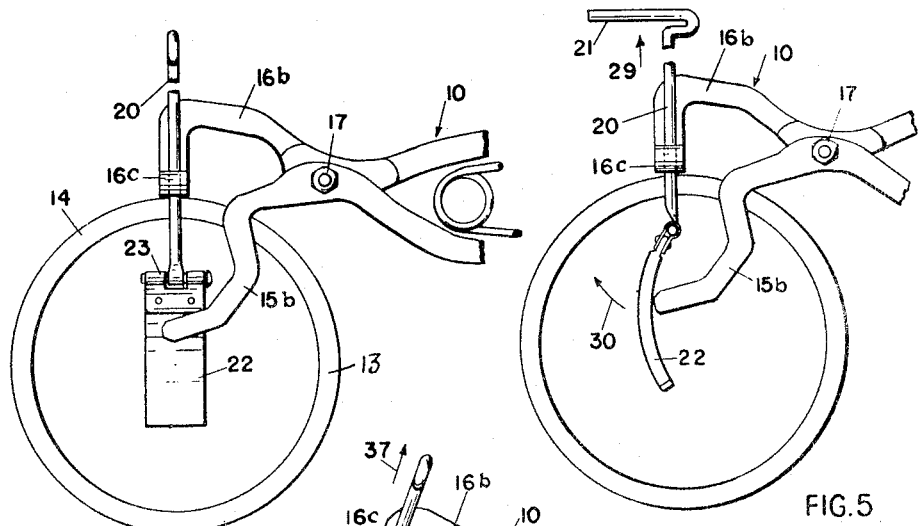
Fig. 4 is an end view similar to Fig. 1, showing the plate in edgewise position, the working legs fully open.
Fig. 5 is another end view showing a further step in the operation, wherein the curved plate was turned transversely to the slot between the pipes, and the second leg of the tool is fully open and engages the curved plate.

The segment 22 will be dropped to a desired depth in the pipes (Fig. 4) and then pressure will be exerted on the grips 18 and 19 of my tool, as indicated by the arrows 27 and 28, thereby opening the working legs 15b and 16b, and the leg 15b also will be inserted by obvious manipulations through the space 13 into the interior of the pipes, as also indicated in Fig. 4, while the leg 16b will be caused to rest on the outside of the pipes, its transverse end 16c bridging the space 13 and resting on both pipes.

The rod 20 will now be turned one-quarter revolution so as to have the plate segment 22 transversely to the slot 13 between the pipes, whereupon rod 20 will be pulled upwardly, arrow 29 (Fig. 5), until the hinge 23 will touch the inside of the pipes, bridging the space 13 between them (Fig. 3), and then the pressure 27 and 28 will be released on the grips 18 and 19, spring 24 will open the handle branches 15a and 16a, and close the working legs 15b and 16b, the leg 15b moving upwardly, arrow 30 (Fig. 5), and pressing the segments 22 against the inside of the pipes as has been described hereinbefore (Figs. 1 and 3), while the outer leg 16b will be pressed on the outside of the pipes, its transverse lower termination 16c bridging the space 13 between the pipes, as has been mentioned hereinbefore.

My tool is now in the position shown in Figs. 1 and 3, and is secured and locked in that position. The welding operation may now start, as indicated at 31 in Fig. 1. The space 13 between the two pipes will be filled with the molten welding material at a sector thereof above the plate segment 22, and it will be obvious that the said segment will prevent any intrusion of the welding material within the pipe, and will keep the inside of the welded portion entirely smooth and of identical diameter as the rest of the pipe.

After the welding of the mentioned section has been finished, a slight pressure (arrows 27, 28) will be exerted on the grips 18 and 19 to slightly open the device, whereupon the device may be moved in a right hand direction (arrow 32) until the outer end 33 of the protector plate segment 22 will be at about the end of the previously finished welding, the working leg 15b moving in the slot 13 and the plate 22 being slightly pressed by said leg sliding along the inside of the pipes. When the plate 22 arrives to the new welding position, the slight pressure on the grips 18, 19 will be released, and the device will be locked in the same position as shown in Fig. 1, but to the right thereof, to a distance about equal to the plate 22.

A new similar welding operation may now be made and the tool then again moved to the right, and these operations repeated until practically the whole circumference of the slot 13 between the two pipes will be filled with the welding material, that is, the ends of the pipes welded to one another to practically the whole area thereof. This position is indicated in Fig. 7, and in said figure, the first welding section is generally indicated by the numeral 34, and its starting end by the numeral 34a, while the last section so welded is indicated at 35, and the terminating end thereof at 35a.

It will be seen that a small portion 36 of the original slot or space 13 between the two pipes will not be filled, said unfilled portion or aperture 36 being needed and used for removing the protecting plate segment 22 and the inner working leg 15b of the tool from within the pipes.

For this purpose the working legs of the tool will be opened up slightly, rod 20 will be turned back one-quarter revolution until the plate segment 22, again, is edgewise registering with the slot 36, whereupon by a slight maneuvering, the inner leg 16b may be removed through the slot 36 and then the segment 22 pulled out by upwardly and outwardly moving the rod 20 (arrow 37).

After the tool has been removed from within the pipes, the remaining short unfilled space 36 may now be welded, and then, if some such welding material may now enter within the space of the pipes, the extent of it will be so small that it will not affect the movement of the fluid in the pipes, as would be the case if the whole circumference of the adjacent pipe ends would be welded without the protection of my device.

In Fig. 6, the dotted line showing of my tool indicates an original position thereof, in which the portion 38 of the welding has been done, and the full line showing of the tool indicates the position thereof during the next adjacent welding operation, as will be understood.

It is to be understood that protecting plate segment 22 will have to be made of such material which is not affected by the molten welding material, that is, at least the outer surface of the plate segment 22 must be of such a nature as not to permit a uniting or adhesion of the welding material therewith or thereto.

It will be obvious that the same method, principle and arrangement of means as has been described hereinbefore, with reference to protecting the inside of two pipes while they are being welded to one another, may be applied in many similar cases where operations are to be performed on a hollow body which has an opening, and when it is desired to protect the inside of the body at and adjacent to said opening.

The transversely bent arm 21 at the upper end of the rod 20 may serve first as a grip for the same, but it also will indicate in which position the protecting plate segment 22 is within the pipes. If the arm 21 is in the plane of the slot 13 between the pipes (Fig. 1) then the plate 22 is turned transversely to said space and to the inside of the pipes, as necessary during the welding operation, and when the arm 21 is turned perpendicularly to the position shown in Fig. 1 (Fig. 2), that is, in parallelism with the pipes and transversely to the slot 13, then the plate segment 22 is registering edgewise with the slot 13, and is in the position to insert the same into the pipes or remove it therefrom.

What I claim as new and want to protect by Letters Patent of the United States is:

1. A process for welding the ends of pipes to one another circumferentially, consisting in placing said pipe ends into registering relation, with a space being left between them, inserting a back up plate through said space within the pipes, said plate having substantially the same curvature as the inside of the pipes, operating on the plate from the outside, whereby it will be placed against a portion of said space, closing it from the inside, filling that portion of the space with welding material, and then successively operating on said plate from the outside, whereby the same will be moved to successive adjacent portions of the space between the pipes, filling each of such space with welding material, leaving a last portion of that space open, and removing said back up plate, and any means operating thereon within the pipes, through said remaining opening.

2. A removable tool to temporarily prevent the entry or projection of foreign material into a hollow body through an opening in the wall thereof, comprising two curved pivoted elements placed side by side, and having respective handle portions at one side of the pivot, and operating leg portions at the other side, both, the handle and leg, of one element curving away from the pivot in one direction, and the handle and leg of the other element curving away from the pivot in the opposite direction, a transverse flange on one leg adapted to rest on the outside of the hollow body bridging the opening in its wall, an inwardly and outwardly slidable rod in said transverse flange, a pivoted protecting plate at the inner end of the rod, adapted to be inserted into the hollow body through the opening in its wall, or to be withdrawn therefrom, a predetermined terminal part of the other operating leg portion of the tool also being adapted to be inserted into the hollow body through said opening, and releasable means adapted to normally press the handle portions of said tool outwardly and close the operating leg portions thereof inwardly toward each other, whereby said transverse flange will be pressed on the outside of the hollow body to rest thereon, and said protecting plate will be pressed by said leg portion inside of said hollow body against the inside of the wall of said body on a portion of said opening, thereby closing said portion of the opening from the inside.

3. A tool for protecting and keeping smooth the inside of a welded portion of the ends of two pipes placed adjacent to, but spaced apart from, one another, comprising two curved pivoted elements placed side by side, and having respective handle portions at one side of the pivot, and operating leg portions at the other side, both, the handle and leg, of one element curving away from the pivot in one direction, and the handle and leg of the other element curving away from the pivot in the opposite direction, a transverse flange on one leg adapted to rest on the outside of the hollow body bridging the opening in its wall, an inwardly and outwardly slidable rod in said transverse flange, a pivoted protecting plate at the inner end of the rod, adapted to be inserted into the hollow body through the opening in its wall, or to be withdrawn therefrom, a predetermined terminal part of the other operating leg portion of the tool also being adapted to be inserted into the hollow body through said opening, said plate being of substantially the same curvature as the inside of the pipes, the terminal portion of the second operating leg of the tool being curved towards the terminal portion of the first leg and in a different plane from said rod, thereby permitting said rod to slide inwardly and outwardly in said first leg at the side of said second leg, resilient yielding means normally tending to open the handle portions of the tool and close the operating leg portions thereof towards each other, said second leg termination, inside of the pipes, then being adapted to press said plate against the inside of said pipe and, cause the same to cover a portion of the space between the two pipe ends.

4. A process for filling an opening in the wall of a substantially closed hollow body by welding, consisting in inserting a plate like back up member into said body through said opening by turning said member edgewise for the purpose, operating on said back up member from outside whereby the same will be turned flat towards the wall of the body and placed against a portion of said opening, thereby closing said portion inwardly, said plate overlapping said opening, filling said portion of the opening with welding material, said plate preventing an intrusion of the welding material into the inside of the hollow body, causing said back up member, by means operable from the outside of the hollow body, to successively move against respective adjacent portions of the opening, successively closing them from the inside, filling said successive portions with welding material, leaving a portion of said opening intact, and removing the back up member from the inside of the hollow body, through said remaining intact portion of the opening by again turning said member edgewise.

5. A tool for protecting and keeping smooth the inside of a welded portion of the ends of two pipes placed adjacent to, but spaced apart from, one another, comprising a back up plate, means to turn the same edgewise and to insert it into the inside of the pipes through said space between them, said plate then being adapted to be turned flat to the walls of the pipes and to overlap the space between them, means to press said plate against said walls over the mentioned portion of said space from the inside, said last mentioned means being operable from the outside, said plate then preventing the welding material, from protruding into the inside of the pipes, means, operable from the outside, adapted to release said back up plate and allow the moving of the same against an adjacent portion of the space between the pipes, whereupon said adjacent portion may be filled with welding material, portions of said plate being adapted to again be turned edgewise to said space and to be so removed from the inside of the pipes through a portion of the space between them, left open.

EMERY DUTCH.

REFERENCES CITED

The following references are of record in the file of this patent:

UNITED STATES PATENTS

| Number | Name | Date |
| --- | --- | --- |
| 2,080,563 | Eskilson | May 18, 1937 |
| 2,277,081 | Delillo | Mar. 24, 1942 |
| 2,328,271 | Greene et al. | Aug. 31, 1943 |